United States Patent [19]

Honeycutt, Jr. et al.

[11] Patent Number: 4,718,230
[45] Date of Patent: Jan. 12, 1988

[54] AUGMENTOR LINER CONSTRUCTION

[75] Inventors: Fred L. Honeycutt, Jr., Lake Park; Howard J. McLean, No. Palm Beach, both of Fla.

[73] Assignee: United Technologies Corporation, Hartford, Conn.

[21] Appl. No.: 929,542

[22] Filed: Nov. 10, 1986

[51] Int. Cl.⁴ ............................................. F02K 3/10
[52] U.S. Cl. .................................. 60/261; 239/127.3; 60/264
[58] Field of Search .................. 60/261, 755, 39.32, 60/271, 39.83, 264; 239/127.1, 127.3, 397.5; 415/115, 116, 117, 178

[56] References Cited

U.S. PATENT DOCUMENTS

| | | | |
|---|---|---|---|
| 2,735,262 | 2/1956 | Geary | 60/261 |
| 2,794,319 | 6/1957 | Stockdale | 60/261 |
| 2,846,842 | 8/1958 | Brown | 60/261 |
| 2,974,486 | 3/1961 | Edwards | 60/261 |
| 3,825,365 | 7/1974 | Peng | 415/117 |
| 3,826,088 | 7/1974 | Nash et al. | 60/261 |
| 3,866,417 | 2/1975 | Velegol | 60/261 |
| 3,966,354 | 6/1976 | Patterson | 415/116 |
| 3,972,475 | 8/1976 | Nelson et al. | 239/397.5 |

Primary Examiner—Carlton R. Croyle
Assistant Examiner—Donald E. Stout
Attorney, Agent, or Firm—Norman Friedland

[57] ABSTRACT

The cooling air for the nozzle of an augmentor of a gas turbine engine is maintained uniformly around the circumference to assure the prevention of hot streaks that would be occasioned by the liner "sagging". A separate end piece having judiciously located gaps for directing air over the nozzles, flaps and seals attached to the end of the augmentor duct maintains concentricity during augmentor operation, and affords support to the liner of the duct.

2 Claims, 2 Drawing Figures

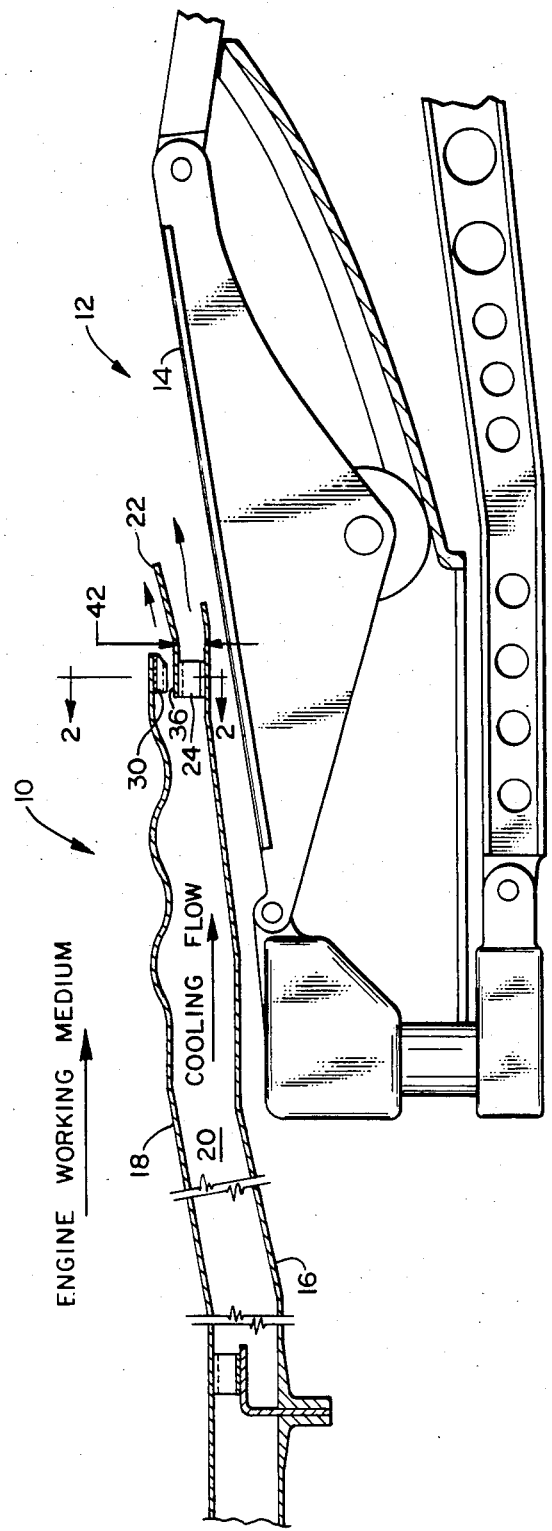
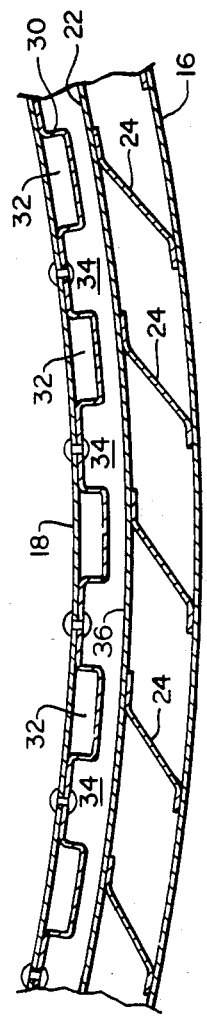
FIG. 1
FIG. 2

AUGMENTOR LINER CONSTRUCTION

DESCRIPTION

1. Technical Field

This invention relates to gas turbine engines and particularly to the construction of the augmentor of the type having cooling provisions for liner and nozzle.

2. Background Art

The augmentor of a gas turbine engine, which is designed to define an additional combustion zone so as to further accelerate the engine's working medium, requires a substantial amount of cooling air to reduce temperature of the components so as to maintain structural integrity. In order to improve engine operation and performance, much effort and emphasis is placed on maximizing the use of the cooling air and only use the minimum amount necessary to accomplish the cooling required. Since the cooling air is generally extracted from the engine and is not utilized for producing thrust, this extracted cooling air is in reality a penalty to the overall performance of the engine. In current augmentors, the liner is disposed between the engine's extremely hot working medium (gas path) and the augmentor's outer casing or duct. Cooling air typically extracted from the engine's compressor is piped to the augmentor liner to flow between the liner and augmentor duct and the air is ultimately discharged over the nozzle flaps disposed at the aft end of the augmentor casing.

Owing to the stack up of tolerances of the augmentor liner and the thermals encountered during operation of the augmentor, the liner tends to become distorted and deviates from its concentricity to the augmentor duct. As is well known, the liner is designed to provide cooling passages which flow cooling air, generally supplied by the engine's compressor, through these passageways and thereafter discharges the cooling air in a judicious manner so as to flow over the seals and flaps of the nozzle located at the end of the augmentor duct. The cooling passages are generally annular in shape and extend axially along the liner. Because of the "sagging" liner, and hence the liner not being centered relative to the engine's augmentor duct, the cooling air discharging from the annular cooling passages becomes uneven around the circumference, resulting in hot streaks on the nozzle flaps and seals, which obviously is undesirable.

Heretofore liners have been designed to have a single point attachment located at the forward end. This cantilevered design necessitated a heavier liner to be structurally credible to withstand the loads encountered. The fact that the liner was cantilever mounted, contributed to the "sagging" condition.

DISCLOSURE OF INVENTION

An object of this invention is to obviate the problems noted above by providing a separate liner end piece that assures that the liner exit remains centered relative to the augmentor duct, thus, providing an even distribution of cooling air to the nozzle.

A feature of this invention is to provide in the separate liner end piece a diffuser end or a flow directing end defining the discharge flow from the liner for directing the cooling air to flow directly on the nozzle's flaps and seals.

A still further feature of this invention is to provide a more efficacious liner that assures concentricity when exposed to extreme thermals while providing an abutment surface on the exit end to provide a rear support of the liner to improve the structural integrity of the liner.

Other features and advantages will be apparent from the specification and claims and from the accompanying drawings which illustrate an embodiment of the invention.

BRIEF DESCRIPTION OF THE DRAWINGS

FIG. 1 is a partial view in section showing the exit end of the augmentor duct including the invention and the associated augmentor nozzle.

FIG. 2 is a partial end view showing a portion of the separate liner end piece of the augmentor and the attachment to the augmentor duct.

BEST MODE FOR CARRYING OUT THE INVENTION

The invention has utility in any type of augmentor, however, with respect to the details of a suitable augmentor where this invention may be used, and for the sake of simplicity and convenience, reference should be made to PW1120 engine manufactured by Pratt & Whitney, a division of United Technologies Corporation the assignee of this application.

Refererence is now made to FIGS. 1 and 2, showing the augmentor generally illustrated by reference numeral 10 and its attached augmentor nozzle generally illustrated by reference numeral 12. The nozzle which comprises the flaps and seals (not shown and both of which are referred to by reference numeral 14), is exposed to the hot gases discharging from the augmentor. As will be described in greater detail hereinbelow the end of the augmentor cooperates with the nozzle in such a manner to discharge cooling air onto the flaps and seals 14 so as to maintain these components within tolerable operating temperatures.

The augmentor 10 comprises an outer generally cylindrically shaped duct 16 and an inner generally corrugated concentric liner 18 spaced from the duct 16 to define an annular cooling passageway 20. The cooling passageway receives cooling air from the compressor of the turbine engine (not shown) which flows axially relative to the flow of the engine's working medium to discharge onto the flaps and seals 14 maintaining the structural integrity of these components.

In accordance with this invention, the exit end piece 22 is attached to the duct 16 by a plurality of "Z" shaped brackets 24 secured at one end to the inner diameter of duct 16 and outer diameter of the exit end piece 22.

A generally sinusoidal shaped annular member 30 is suitably attached to the liner, say by rivets or the like, and defines hills and valleys that permit the cooling air to flow in alternate passageways 32 and 34. The peak of the sinusoidal member 30 extends radially outward and stops short of the inner surface 36 of the separate end piece 22.

Bracket 24 extending radially inward toward liner 18 is adjacent the sinusoidal member 30 as is attached at the outer diameter to duct 16 and supports the separate end piece 22.

As is apparent from the foregoing, the duct 16 and the fore end of separate end piece 22 in the nonoperational condition define a gap 42. It is important to note that the area of gap 42 is predetermined so as to assure that the nozzle obtains the optimum cooling at all operating conditions.

Upon operation of the augmentor, the high temperature heats the liner causing it to expand circumferentially forcing the peak of the sinusoidal member 30 to abut the separate end piece 22. Obviously the alternate passages 32 and 34 remain open to flow the cooling air to the nozzle surface. Liner separate end piece 22 is, during all conditions of operation, immersed in a stream of cold air around its entire circumference. This not only assures that both sides of the separate end piece are air cooled by convection but it also serves to prevent the heat from the hot gases from migrating to this element. This assures that there will be a uniform distribution of cooling air to the nozzle. The abutment also serves to support the liner at the exit end. Hence the liner when distorted not only is compelled to remain concentric to the augmentor duct to assure that the cooling air is distributed uniformly around the circumference, preventing hot streaks from migrating to the nozzle, but also helps the abutment support the liner.

While the separate end piece is shown to be conically shaped and is circular in any transverse plane, the separate end piece 22 and aft end of duct 16 may be dimensioned to complement the surfaces of the nozzle. Hence, the circumference may take the form of a polygon, where the flat segmented surfaces would conform to and complement the flat surfaces of the flaps and seals of the nozzle.

From the foregoing it is apparent that this invention serves to optimize cooling of the nozzle, and improves the structural integrity of the liner by providing additional support.

The invention also affords maintainability advantages over the heretofore design inasmuch as the separate end piece 22 can be removed independently of the liner, and hence facilitates the replacement of this element as opposed to replacing a section of or the entire liner.

It should be understood that the invention is not limited to the particular embodiments shown and described herein, but that various changes and modifications may be made without departing from the spirit and scope of this novel concept as defined by the following claims.

We claim:

1. An augmentor for a gas turbine engine having a gas path for flowing the engine's working medium including a generally circular shaped duct, a variable nozzle attached to the end of the duct in proximity to the engine's working medium exiting from said duct, a generally circular shaped liner attached to the end of said engine concentrically disposed relative to said duct and defining an open ended annular flow path for receiving cooling air between said engine's liner and said duct, said liner terminating in proximity to the exit plane of said duct, the improvement comprising an annular, circumferentially disposed sinusoidally shaped member attached to the end of said liner adjacent the exit end of said duct and extending radially outwardly relative to the engine's working medium and defining open ended passageways, a separate end piece supported to said duct in proximity to said sinusoidal member for distributing the cooling air discharging from said open ended annular flow path and said open ended passageways of said sinusoidally shaped member to said nozzle for defining a uniform flow path around the circumference of said nozzle and to support the liner, one end of said separate end piece providing an abutment for supporting said sinusoidally shaped member when said sinusoidally shaped member is expanded by said engine working medium and said separate end piece extending axially beyond the exit end of said duct and defining with said duct an annular gap having a predetermined auunlar dimension for providing a predetermined amount of cooling air to flow to said nozzle throughout the operating range of said augmentor.

2. An augmentor as defined in claim 1 including attaching means extending from said duct to the end of said separate end piece adjacent the end in proximity to said sinusoidally shaped member.

* * * * *